Aug. 10, 1948. A. Z. MAMPLE 2,446,543
CABLE SPLICE JOINT AND METHOD OF MAKING SAME
Filed Nov. 26, 1942
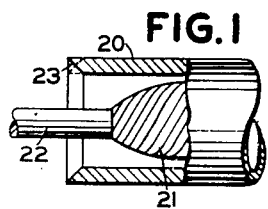
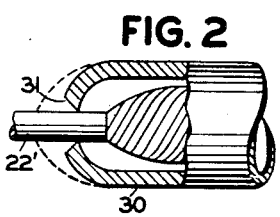
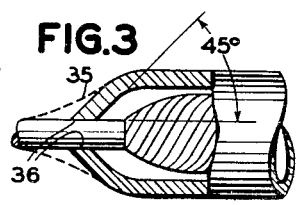
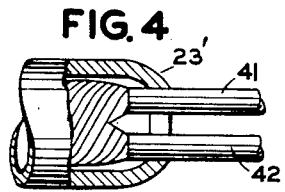
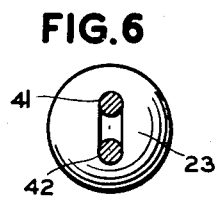
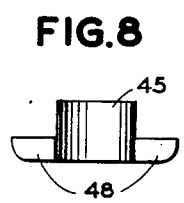
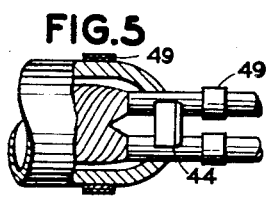
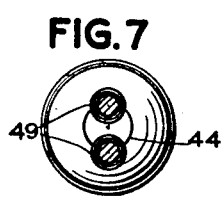
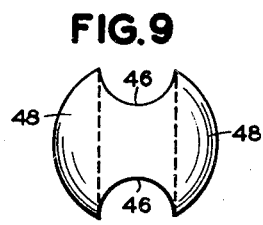
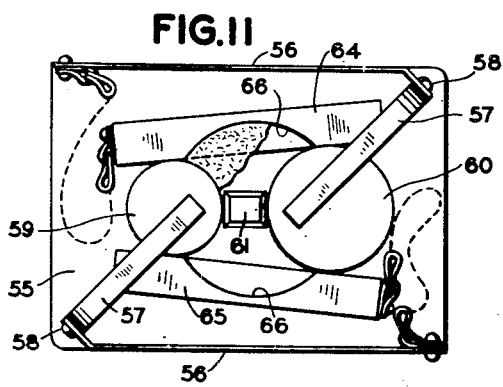
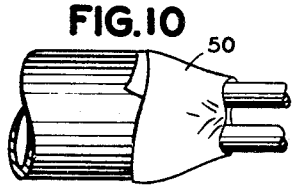
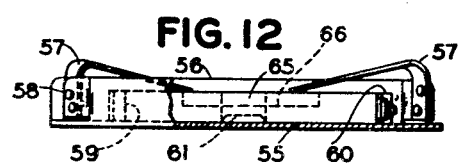
*INVENTOR*
A. Z. MAMPLE
BY
*ATTORNEY*

Patented Aug. 10, 1948

2,446,543

UNITED STATES PATENT OFFICE 2,446,543

CABLE SPLICE JOINT AND METHOD OF MAKING SAME

Adolph Z. Mample, Glen Rock, N. J., assignor to The Western Union Telegraph Company, New York, N. Y., a corporation of New York Application November 26, 1942, Serial No. 467,002

7 Claims. (Cl. 174—84)

My invention relates generally to a new and improved joint for sealing splices in electrical cables, and more particularly to wiped joints or splices in lead covered cables.

Lead covered cables are spliced by means of lead sleeves which usually are cut off square, tapered on the outer surfaces of the ends thereof, and cleaned with a rasp, the sleeve extending over the splice and being sealed to the cable sheaths with wiping solder to form wiped joints. The outer tapered surfaces of the sleeve are coated with a suitable material, such as stearine, which keeps them clean and acts as a flux in soldering. When the sleeve is in proper position over the splice, the ends are beaten in with a cable dresser until they contact the lead cable sheath at each end of the splice. Pasters are then placed on the cable sheaths and on the sleeve so as to allow a space of the order of two to two and one-half inches for wiping each of the joints, the pasters preventing the wiping solder from adhering to the sheaths and the sleeve beyond the limits of the joints. The joints are well tinned and wiped to shape, the solder being applied by pouring it from a ladle and catching the drippings in a catch cloth which may also be used as a wiping cloth. Heretofore, the ends of the sleeve have been beaten in against the sheaths until they were substantially perpendicular to the cables, the space between the ends and the cable sheaths being filled with the wiping solder.

The conventional method of thus wiping cable joints has several disadvantages. One disadvantage is that an undesirably large quantity of wiping solder must be applied at the ends of the sleeve, and another disadvantage is that the joint is sealed solely by the mass of the wiping solder adjacent to the ends of the sleeve. The large mass of wiping solder necessary in the type of joint heretofore used is disadvantageous particularly because of the scarcity of the tin and lead of which such wiping solder ordinarily is composed, which materials are urgently needed in the production of defense materials. Also, since the sealing is effected only by the wiping solder adhering to the joint, if portions of the wiping solder become porous, as due to working the solder too close to its solidus point, the joint may be or become porous to the extent that moisture subsequently leaks into the splice, thereby destroying the insulating properties of the paper or other insulation around the conductors within the splice. This is particularly apt to occur, and to a greater extent, in the case of two-way or multiple joints in which two or more cables may be spliced to one end of a single cable. In making two-way or multiple joints heretofore, a separator block was driven between the cables entering at the same end of the splice and the sleeve then beaten in at the sides of the block, the blocks being approximately one-half inch thick and made from scrap sheath. The difficulty with this is that, as the hot wiping solder is poured over the adjoining end of the sleeve and cable sheaths during the wiping operation, the metal around the top, sides and bottom of the joint will be considerably hotter than the separator block or the metal subsequently forced in the crotch between the two cables, so that the metal between the cables either does not have a sufficiently high temperature or, if its temperature is raised sufficiently high, the temperature of the remainder of the joint obviously will be too high and have a tendency to melt the lead comprising portions of the cable sheath and the sleeve. In practice, what often occurs is that by the time the outer portion of the joint is formed, the inner portion in the crotch between the cables, which is heated by secondary heat, has cooled until it has approached the point where further wiping or finishing of the joint in the crotch tends to cause the metal to become porous at this place when thus worked.

One of the objects of the invention is to obviate the disadvantages of the foregoing types of joints for cable splices and to produce a joint in which there is a moisture-proof sweated joint of substantial extent between adjoining surfaces at the abutting ends of the sleeve and the cable sheaths, in addition to the sealing effect provided by the mass of wiping solder applied to the joint.

Another object is a suitable cable joint in which the mass of wiping solder required is appreciably less than that required with splices of the prior art types, thereby effecting a considerable saving in the amount of metals such as tin and lead which are deemed essential to the national defense.

Still another object is to provide a cable sealing splice in which, notwithstanding that the amount of wiping solder required is considerably less, has sufficient lateral strength to minimize cracking or opening of the joint when lateral stresses are applied to the cable or the sleeve.

An additional object is a multiple joint for a splice in which greater uniformity in heating of the wiping solder at different places in the wiped joint is insured during the wiping operation whereby there is less tendency for the wiping solder to become porous during the finishing operation.

A further object is a splice in which a greater sealing effect is obtained at the outer surface portion of the wiping solder comprising the ends of the splice.

Additional objects and advantages will be apparent from the following detailed description taken in connection with the accompanying drawings, in which:

Fig. 1 shows a splicing sleeve which has had the ends thereof prepared or formed in accordance with the instant invention, the figure illustrating the difference between the old method and the instant method of forming sleeves;

Fig. 2 shows the general position and configuration of the ends of the splicing sleeve when prepared and beaten in against the cable sheath in accordance with prior art methods;

Fig. 3 illustrates the position and configuration of the ends of the splicing sleeve when prepared and beaten in against the cable sheath in accordance with the instant invention;

Figs. 4 and 5 illustrate certain steps in the wiping of a multiple splice in accordance with the invention;

Fig. 6 is an end view of Fig. 4;

Fig. 7 is an end view of Fig. 5;

Figs. 8 and 9 are elevational and plan views, respectively, of a heat-conducting separator block employed in the method shown in Figs. 4 and 5;

Fig. 10 illustrates a method of causing a suitable amount of the eutectic in the wiping compound to be forced to the outer portion of a wiped joint for sealing the same;

Figs. 11 and 12 are top plan and elevational views, respectively, of a device for molding the separator blocks shown in Figs. 4 to 9; and Fig. 13 shows an assembly of molding discs of various sizes to correspond to different sizes of cables with which the molded separator blocks may be used.

Referring to Fig. 1 of the drawings, there is shown a splicing sleeve 20 which has been formed in accordance with the instant invention. The sleeve has been placed over a splice 21, the splice having been wrapped with muslin in conventional manner. The outer end of the sleeve extends over the cable sheath 22 a sufficient distance so that, when the sleeve is beaten in against the sheath, the sheath will extend approximately the desired distance from the end of the splice 21. Prior to the insertion of the sleeve over the splice the inner surface of the end of the sleeve is formed with a rasp or file so that it is beveled, as shown, this beveled portion forming a suitable angle with the outer surface of the sleeve so that, when the end of the sleeve has been beaten in, as shown in Fig. 3, the angle of the beveled surface portion 23 will be substantially a complement of the angle at which the beaten-in end of the sleeve contacts the cable sheath 22, as hereinafter explained. Fig. 1 also shows in dotted outline the manner in which cable sleeves prior to the invention have been beveled, and it will be noted that the conventional method heretofore was to file or rasp the outer surface of the end of the sleeve to provide an outer tapered or beveled portion thereon.

Fig. 2 illustrates how a cable splicing sleeve 30 of the type heretofore employed appears after it has been beaten in against the cable sheath 22'. As above stated, the outer surface of the end of the sleeve was filed, as indicated at 31, and it will be noted that, after the end of the sleeve is beaten in, there remains only a line contact between the abutting surface of the sleeve and the cable sheath 22'. As indicated in the figure, the end of the sheath was beaten in until it is nearly full round to meet the cable and thus is nearly perpendicular to the cable or at least providing an angle in the neighborhood of 80° with the cable, as indicated in the figure. After the sheath was thus beaten in, the joint was wiped with solder, the outer surface of the mass of wiping solder applied being indicated in dotted lines in the figure. By the prior art method, not only was a very considerable amount of wiping solder required, but due to the small point or knife-edged contact of the sleeve with the cable sheath the sealing of the joint depended substantially entirely upon the mass of the wiping solder applied.

Fig. 3 shows how the end of the cable sleeve is beaten in in accordance with the instant invention. Assuming the angle at which the inner beveled surface of the end of the sleeve was formed to be approximately 45°, which is a convenient angle to use, it will be noted that the angle at which the end of the sleeve approaches the cable sheath is the complement of this angle, i. e., 45°. By making the angle of the end of the sheath the complement of the angle at which the inner surface of the sleeve was beveled, this causes substantially the entire inner beveled surface to fit flush against, and be parallel to, the outer surface of the cable sheath, and thus there is provided a relatively large area of surface contact where the end of the sleeve abuts the cable sheath. The length of this area as measured along the cable sheath is approximately one and one-half times the thickness of the wall of the sleeve. After the beveled end of the sleeve has been cleaned and covered with a suitable flux such as stearine, and the end of the sleeve has been beaten in with a cable dressing tool, cable pasters (not shown) are applied to the sleeve and cable sheath in known manner to prevent the wiping solder from adhering to the sheath and sleeve beyond the desired limits of the joint, and the wiping solder is applied by pouring it from a ladle. When the wiping solder is applied, the area formed by the relatively large surface contact area between the end of the sleeve and the cable sheath due to the parallel juncture of the sleeve and sheath, results in a moisture-proof sweated joint 36 being formed between these surfaces, independently of the wiped joint, and this seals the joint and provides a secondary seal in addition to the sealing effect provided by the mass of wiping solder applied to the joint.

The dotted line 35 in Fig. 3 shows the contour of the outer surface of the wiped joint, and it will be noted that only a small amount of wiping solder is required in contrast to that necessary in joints of the type heretofore employed and as shown in Fig. 2.

Since the splice is effectively sealed by the sweated joint between the abutting ends of the sleeve and cable sheath, should the wiped joint become porous, such as sometimes occurs when the cable splicer works the wiping solder too close to its solidus point or because of improper mixture of the solder or otherwise, nevertheless the splice remains sealed by the sweated joint, and the splice will not leak. Also, due to the fact that the sleeve and cable sheath are thus sweated together, the sweated joint is in itself strong, and notwithstanding that a much smaller amount of wiping solder is applied, the completed joint has sufficient lateral strength to minimize cracking or opening of the joint when lateral stresses are applied to the cable or the sleeve, the lateral strength equaling and in many cases exceeding that of the conventional joints in which a relatively large mass of wiping solder was required. Moreover, with the substantial reduction of tin and lead in wiping solder (formerly 40% tin and 60% lead were usually employed) due to the scarcity of these metals and the need for using them in national defense, it has been necessary to substitute in part other available metals which tend to reduce the working range and result in porous joints, just as working the former wiping solder too close to its solidus point frequently produced. The secondary seal produced by the sweated joint prevents leakage which would thus otherwise occur.

Figs. 4 to 7 illustrate a method of wiping a two-way or multiple joint. In such joints the solder has to be worked and occasionally poured in between the two cables 41 and 42 in the crotch in order to heat the cables and separator block as much as possible. Heretofore with the conventional separator block employed, as the hot wiping solder was poured over the adjoining ends of the sleeve and cable sheath during the wiping operation, the metal around the top, sides and bottom of the joint would be considerably hotter than the separator block or the metal subsequently forced in the crotch between the cables. Since the inner portion in the crotch between the cables is heated mainly by secondary heat, it often had cooled until it had approached the point where wiping and finishing of the joint in the crotch tended to cause the metal to become porous at this place when thus worked, thereby producing leaky joints in various instances. This disadvantage is obviated when a separator block of the kind disclosed in Figs. 5 and 7 to 9 is employed. Referring to Fig. 4, the sleeve has been prepared in the manner of the sleeve of Figs. 1 and 3, that is, the inner surface of the end of the sleeve has been filed to form a beveled surface having an angle of approximately 45° relative to the outer surface of the sleeve, and the beveled or tapered portion has been cleaned and covered with stearine. The sleeve has then been beaten in with a cable dresser at the top and bottom until it meets the cable at an angle of about 45°, while the sides are beaten in until the sleeve forms a straight line approximately tangent to both cables 41 and 42, as seen in Fig. 4. After the sleeve has been beaten in until the tapered end 23' thereof abuts the adjacent cables, a separator block 44 is carefully driven between the cables and back against the sleeve, as shown in Figs. 5 and 7.

The preferred form of separator block is illustrated in detail in Figs. 8 and 9. As appears from these figures, the block has a body portion 45 which has circular concave edges 46, Fig. 9, the concave edges conforming respectively to the outer circular configuration of the two cables 41 and 42. Butterfly flanged portions 48 integral with the body portion 45 are beveled, as shown in Fig. 8, and the flanged face and underside of the flanges are covered with stearine, after which the separator block is driven back to the sleeve until the flanges 48 contact the sleeve. The edges of the flanges are beaten down to firmly meet the sleeve on both sides and then cable pasters 49 are applied to the sleeve and cables, as seen in Fig. 5.

In wiping two-way or multiple joints, the solder is worked and occasionally poured in between the cables in the crotch in order to heat the cables and the separator block 44 as much as possible. The butterfly flanges on the separator block are always in contact with the solder of primary heat during pouring and initial working operations and therefore assist in conducting the heat into the crotch and thus compensate for the reduction in the effective working temperature range of the solder applied in the crotch. After the sleeve and cables have been brought up to the proper temperature by pouring the hot wiping solder over the cables and sleeve, the joint is finished as quickly as practicable, the final shaping and finishing being done with a preheated wiping cloth. The crotch is then cut out with twine immediately after finishing the joint and preferably is cut in a vertical straight line from the edge of one paster to the other paster shown in Fig. 5, but is not cut out back of the pasters.

Immediately after the surplus solder has been cut out of the crotch of the multiple joint, a wet pad or cloth is placed under the joint and wrapped around the wiped joint with the ends over lapping at the top, as shown in Fig. 10. The cloth 50 should be lightly pushed in the crotch on both sides and held in place around the joint but should not be held too tightly, since the solder may be moved during the cooling period. The method shown in Fig. 10 insures that a greater sealing effect is obtained on the outer surface of the wiping solder because due to the rapid cooling caused by application of the wet cloth, a suitable amount of the eutectic in the wiping solder is caused to be forced to the outer surface portion of the wiped joint, and this eutectic provides a much better seal for the joint. The manner in which the eutectic is thus caused to be forced to the surface portion of the joint appears to be due to the fact that as the particles of lead and tin near the surface of the joint are cooled by the wet cloth, the shrinkage or contraction of these particles in the metal forces the eutectic, which has a lower melting point than that of either the lead or tin, to and near the surface of the joint. It will be appreciated that the advantage of thus forcing the eutectic to the surface applies equally to single or one-way joints.

Figs. 11 and 12 illustrate a form of molding device by means of which flanged heat-conducting separator blocks 44 may readily be molded. The molding device comprises a metal tray 55 having up-turned side portions 56 to which generally flat springs 57 are secured at one end 58 thereof to ends of the edge portions 56. The flat springs serve to hold molding discs 59 and 60 of wood or other suitable material in place, the discs having suitable diameters, depending upon the diameters of the cables entering the multiple splice. In the figure, the molding discs are of different sizes, thereby to accommodate cables of different sizes. The two discs are placed in the molding device so that they are approximately one-half inch apart, this distance being fixed by means of a metal block 61 which is brazed or otherwise secured to the bottom of the molding tray.

The discs are placed under the springs 57, and molding bars 64 and 65 are then placed against the peripheries of the discs 59 and 60 and secured in any suitable manner. Each molding bar has a curved recessed portion 66 which forms the butterfly flanges 48 shown in Fig. 9. The recessed portion or segment for any combination of cable sizes should be one where the end of the arc that defines the outline of the butterfly flanges is closest to the point of tangency of the bar and the discs as shown in Fig. 11. Molten lead obtained from scraps of lead sheathing or sleeving is then poured in the opening between the discs 59 and 60 until level with the top of the discs and allowed to cool. The hot lead should be poured between but not against the wooden discs. The separator block after cooling is then readily removed from the molding device, as the curved edges of the flanges are beveled, as shown in Fig. 8.

Fig. 13 shows an assembly of molding discs 68 of various sizes which when not in use conveniently are held assembled by means of a threaded bolt or rod 70 that passes through central holes in the molding discs, the discs being held on the rod 70 by means of nuts or in other suitable manner.

Various modifications of the foregoing apparatus and methods will readily suggest themselves to those skilled in the art without the exercise of inventive skill or without departing from the spirit of the present invention, and I do not wish to be limited, therefore, except as indicated by the scope of the appended claims.

What I claim is:

1. In the art of making a cable joint with a sleeve secured at either end to the cable sheath by a wiped joint, the method of providing two seals for the end of the joint which comprises forming in an end of the sleeve an inner beveled end surface, beating in the said end of the sleeve at an angle such that the beveled surface abuts and is substantially parallel to the surface of the cable sheath, applying wiping solder to the sleeve and cable sheath in a manner to produce a sweated sealing joint between said abutting parallel surfaces of the beveled end of the sleeve and the cable sheath, and applying additional wiping solder in a manner to form a wiped joint around said end of the sleeve and the cable sheath.

2. In the art of making a cable joint with a sleeve secured at either end to the cable sheath by a wiped joint, the method of providing two seals for the end of the joint which comprises forming in an end of the sleeve an inner beveled end surface with a predetermined acute angle between said surface and the outer longitudinal surface of the sleeve, beating in the end of the sleeve until it abuts the surface of the cable sheath at an angle which is substantially the complement of the said angle of the beveled surface, applying wiping solder to the sleeve and cable sheath in a manner to produce a sweated sealing joint between said beveled end surface of the sleeve and the cable sheath, and applying additional wiping solder in a manner to form a wiped joint around said end of the sleeve and the cable sheath.

3. In the art of making a cable joint with a sleeve secured at either end to the cable sheath by a wiped joint, the method of providing two seals for the end of the joint which comprises forming in an end of the sleeve an inner beveled end surface with an angle of approximately 45° between said surface and the outer longitudinal surface of the sleeve, beating in the end of the sleeve until it abuts the surface of the cable sheath at an angle of approximately 45°, applying wiping solder to the sleeve and cable sheath in a manner to produce a sweated sealing joint between said beveled end surface of the sleeve and the cable sheath, and applying additional wiping solder in a manner to form a wiped joint around said end of the sleeve and cable sheath.

4. In the art of making a multiple cable joint with a sleeve which is secured at one end thereof to a plurality of cables by a wiped joint, the method which comprises beating in the end of the cable sleeve around said cables, inserting a good heat-conducting separator block having flanged portions in the crotch between the cables and forcing said flanged portions against the beaten-in end of the sleeve, and applying hot wiping solder to said flanged portions to cause the heat from the solder readily to be transferred by said separator block and the flanged portions thereof to the crotch to increase the temperature of the wiping solder applied to the crotch and thereby enable working of the wiping solder in the crotch before the solder approaches too closely to its solidus point.

5. In the art of making a cable joint with a sleeve secured at either end to the cable sheath by wiping the joint with a wiping solder having a lead phase and including a eutectic, the method of sealing the wiped joint in and near the surface thereof which comprises wiping the joint and applying to the wiped joint while hot a cooling liquid in such manner as to cause rapid cooling and contraction of particles of the lead phase of the wiping solder and force the eutectic to the surface portion of the wiped joint to seal the same.

6. In the art of making a cable joint with a sleeve secured at either end to the cable sheath by wiping the joint with a wiping solder having a lead phase and including a eutectic, the method of sealing the wiped joint in and near the surface thereof which comprises wiping the joint and wrapping the wiped joint while hot with a cloth which carries a cooling liquid in such manner as to cause rapid cooling and contraction of the particles of the lead phase of the wiping solder and force the eutectic to the surface portion of the wiped joint to seal the same.

7. A cable spacer for insertion in the crotch formed by a plurality of cables in a multiple spliced joint, comprising a body portion formed to fit between the cables and flanged portions extending from the body portion for engagement with the beaten-in end of the splicing sleeve, said body and flanged portions having good heat conductivity to transfer heat from the wiping solder applied to the joint to the crotch.

ADOLPH Z. MAMPLE.

REFERENCES CITED

The following references are of record in the file of this patent:

UNITED STATES PATENTS

| Number | Name | Date |
|---|---|---|
| 286,950 | Martin | Oct. 16, 1883 |
| 1,113,138 | Penote | Oct. 6, 1914 |
| 1,613,740 | Buck | Jan. 11, 1927 |
| 1,689,323 | Buck | Oct. 30, 1928 |
| 1,870,902 | Giesler | Aug. 9, 1932 |
| 1,965,540 | Atkinson | July 3, 1934 |
| 2,016,004 | Gay | Oct. 1, 1935 |
| 2,142,884 | Chaplin | Jan. 3, 1939 |
| 2,307,001 | Johnson | Dec. 29, 1942 |
| 2,315,426 | Humphrey | Mar. 30, 1943 |